US008516558B2

(12) United States Patent
Crandell

(10) Patent No.: US 8,516,558 B2
(45) Date of Patent: Aug. 20, 2013

(54) POLLING AUTHENTICATION SYSTEM

(76) Inventor: Jeffrey L. Crandell, Hermosa Beach, CA (US)

( * ) Notice: Subject to any disclaimer, the term of this patent is extended or adjusted under 35 U.S.C. 154(b) by 897 days.

(21) Appl. No.: 12/390,818

(22) Filed: Feb. 23, 2009

(65) Prior Publication Data
US 2009/0217361 A1    Aug. 27, 2009

Related U.S. Application Data

(60) Provisional application No. 61/031,164, filed on Feb. 25, 2008.

(51) Int. Cl.
*H04L 29/06* (2006.01)
(52) U.S. Cl.
USPC ............................................................ 726/5
(58) Field of Classification Search
USPC ............................................................ 726/5
See application file for complete search history.

(56) References Cited

U.S. PATENT DOCUMENTS

| 5,495,533 | A | 2/1996 | Linehan et al. |
| 2002/0095600 | A1 | 7/2002 | Deen et al. |
| 2006/0251021 | A1* | 11/2006 | Nakano et al. ............ 370/331 |
| 2008/0178278 | A1* | 7/2008 | Grinstein et al. ............ 726/12 |

FOREIGN PATENT DOCUMENTS

| EP | 0986209 A2 | 3/2000 |
| EP | 0992145 A1 | 4/2000 |
| EP | 1313292 A2 | 5/2003 |
| EP | 1313292 A2 * | 5/2003 |
| WO | WO-01/65768 A2 | 9/2001 |

OTHER PUBLICATIONS

International Search Report for PCT/US2009/034966 dated Aug. 13, 2009 (4 pages).

* cited by examiner

*Primary Examiner* — Jason Gee
(74) *Attorney, Agent, or Firm* — Rader, Fishman & Grauer PLLC

(57) ABSTRACT

An exemplary authentication method includes sending a polling inquiry to an authentication module, identifying a passive notification sent from the authentication module in response to the inquiry, accepting authentication credentials in response to the passive notification, and transmitting authentication information based on the authentication credentials to the authentication module. An exemplary authentication system includes a remote server in communication with a client computer and hosting an access control module. An authentication server is in communication with the remote server and hosts an authentication module. A polling module is in communication with the authentication and access control modules, and is configured to send a polling inquiry to the authentication module, identify a passive notification sent from the authentication module in response to the inquiry, accept authentication credentials in response to the passive notification, and transmit authentication information based on the authentication credentials to the authentication module.

21 Claims, 6 Drawing Sheets

POLLING AUTHENTICATION SYSTEM

TECHNICAL FIELD

The present disclosure relates to user authentication in a distributed computing environment, and more particularly to authentication schemes that may supplement an existing application environment.

BACKGROUND

Distributed computing environments, including web application environments, generally require client users to identify themselves through an authentication scheme. Authentication may involve the comparison of credentials provided by a user at the time of a request against a previously stored set of credentials. Such a comparison provides a degree of certainty that user providing the credentials at the time of a request is the same user that provided the initial set of credentials. The identity of the user may be established by obtaining the initial set of user credentials through a trusted arrangement, e.g., in person, in association with a secondary identification, etc.

The distributed nature of an application environment may entail numerous entities that independently operate servers and client workstations on distinct, yet interconnected, networks. Accordingly, significant coordination and integration issues may develop. One particular coordination issue relates to firewalls. Firewalls generally restrict network communication to only a limited set of trusted transmissions. Entities wanting to establish a new communications protocol often become thwarted by institutionalized firewall policies that are reluctant to recognize new types of transmissions as trusted.

As more and more entities rely on a particular communication protocol, the protocol may become entrenched and therefore resistant to change. Accordingly, new features may be required to overlay or operate parallel to existing technology without modifications thereto. For instance, it may be infeasible to implement advances in authentication techniques, such as the use of biometrics, into existing distributed applications due to the degree of reprogramming and protocol changes that would be required at each of the various systems and components.

BRIEF DESCRIPTION OF THE DRAWINGS

Embodiments of the disclosure will now be described, by way of example, with reference to the accompanying drawings, wherein.

DETAILED DESCRIPTION

Figure 1:
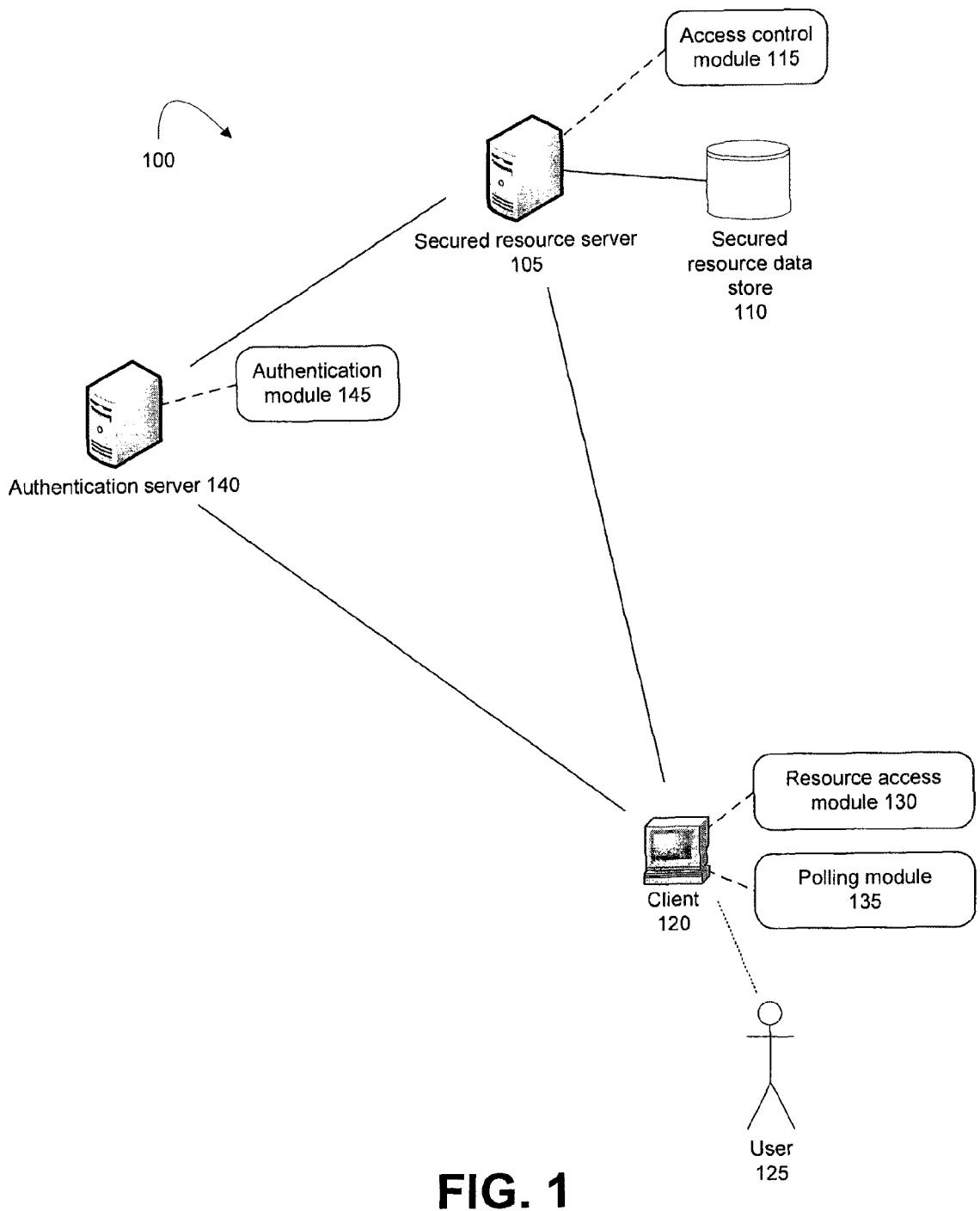
FIG. 1 is a system diagram of an exemplary distributed application environment using a polling authentication scheme.

The present disclosure relates to an authentication scheme and particularly to a polling authentication scheme adapted for use in a distributed application environment.

Exemplary illustrations of a polling authentication scheme are described below. In the interest of clarity, not all features of an actual implementation are described in this specification. It will of course be appreciated that in the development of any such actual illustration, numerous implementation-specific decisions must be made to achieve the developers' specific goals, such as compliance with system-related and business-related constraints that will vary from one implementation to another. Moreover, it will be appreciated that such a development effort might be complex and time-consuming, but would nevertheless be a routine undertaking for those of ordinary skill in the art having the benefit of this disclosure.

Referring now to the drawings wherein like numerals indicate like or corresponding parts throughout the several views, exemplary embodiments are illustrated.

FIG. 1 illustrates an exemplary distributed application environment 100. A distributed application environment 100 may provide a facility such as a computer program or application through a secured resource server 105 to a remote client 120. In many cases there will be numerous remote clients 120. The distributed nature of the environment 100 may result from geographic distribution of the various components, scalability needs, components that are provided by distinct entities, etc. The client 120 may include software such as a resource access module 130 that is programmed to communicate with the resource access server 105 according to a predefined protocol. As the number of clients 120 increases, the resource access module 130 as well as the underlying communication protocol may become entrenched. The entrenchment can cause resistance to modifications due to the effort and expense that may need to be incurred as a result of any changes. However, certain changes, such as changes to security protocols and enhanced authentication schemes may need to occur as older techniques become insufficient.

Should the secured resource server 105 desire to implement a new or enhanced authentication scheme, significant reprogramming may need to occur at the client 120. Additionally, client 120 devices may face a strict security policy that limits or outright bans any incoming communications that are not received as a response to a request initiated by the client 120. For instance, a firewall implemented on the network that hosts the client 120 may limit the client 120 to initiating requests to devices beyond the firewall and receiving communications in response thereto. Such a security policy may interfere with the implementation of a new authentication scheme. Accordingly, the distributed application environment 100 may be supplemented with an access control module 115, an authentication server 140, an authentication module 145, and a polling module 135. As will be discussed in detail below, these exemplary components may minimize the amount of reprogramming while negotiating existing security policies. An audit trail for all authentication events, including successful and failed attempts may be maintained. This audit trail can be useful as proof that an individual accessed a protected resource, or initiated a transaction.

Details of exemplary processes are provided below with respect to FIGS. 3-7. However, a brief overview of the interactions between the components of the environment 100 is provided to demonstrate an exemplary sequence of communications. A user 125 at the client 120 may request a facility of the secured resource server 105 through the use of the resource access module 130. The access control module 115 may intercept the request from the resource access module 130 and recognize that the user 125 needs to be authenticated. The access control module 115 may notify the authentication module 145 that the user 125 needs to be authenticated. Because a security policy may prevent the authentication server 140 from initiating a communication with the client 120 to authentication the user 125, the authentication module 145 may simply create a record of the fact that the user 125 needs to be authenticated. The polling module 135 may poll, or query, the authentication module 145 on a regular basis to determine whether there are any records indicating that the user 125 should be authenticated.

When the polling module 135 receives a response indicating that the user 125 should be authenticated, the user 125 may be challenged to provide identifying credentials. The credentials, or a derivative thereof, may be passed by the polling module 135 to the authentication module 145. The authentication module 145 will then compare the credentials with a trusted set of credentials to see if there is a match, which provides a degree of certainty that the same user 125 provided both the trusted credentials and the instant credentials. Upon a match, the authentication module 145 may deem the user 125 to be authenticated. The authentication module 145 may then notify the access control module 115 that the user 125 was authenticated. After receiving notice of the authentication, the access control module 115 may allow the original request for a facility of the secured resource server 105 to proceed.

The distributed application environment 100, 200 (FIG. 2) generally operates across at least one computer network. The lines connecting the servers 105, 140, 205 (FIG. 2), and the client 120 represent generalized network connections. Network connections may be provided by a local area network (LAN), wide area network (WAN), as well via the Internet. The actual connections may be made by various media including wires, radio frequency transmissions, and optical cables. Intervening networks and network devices, e.g. switches, routers, etc., that may be present in an implementation of the distributed application environments 100, 200 are omitted for simplicity of illustration.

The secured resource server 105, which may be an application server such as a web application server, may be communicatively coupled to a secured resource data store 110. Application servers generally provide access to various facilities that combine programming logic, processing power, and data and file access. An access control module 115 associated with secured resource server 105 may provide software instructions that regulate access to the facilities provided by the secured resource server 105, such as data held in the secured resource data store 110. Other facilities of the secured resource server 105 may include software functions for manipulating and interacting with data stored in secured resource data store 110. The facilities of the secured resource server 105 are not limited to use of the secured resource data store 110. For instance, the facilities could also include access to files, other computer systems, access to any other electronic resource that has restricted or protected access, etc.

As discussed above, the facilities of the secured resource server 105 are not necessarily data files. A facility may include a transaction that does not involve the receipt of data by the user 125. For example, a transaction may be a bank wire transfer. The secured resource server 105 may require the user 105 to be authenticated prior to initiating or completing the transaction.

As discussed above, the secured resource data store 110 represents one exemplary facility that may be provided by the secured resource server 105. The secured resource data store 110 may be a relational database management system (RDBMS). Many such systems, including SQL Server, Oracle, and MySQL, among others, are generally available. The secured resource data store 110 generally stores data in row and column table format, and may include multiple tables. A row, or record, includes one or more columns, or fields, holding data values for specifically defined fields. Rows may be uniquely identified by the values of one or more columns. Indexes of one or more columns can be included to aid in searching for particular rows of the table.

Figure 2:
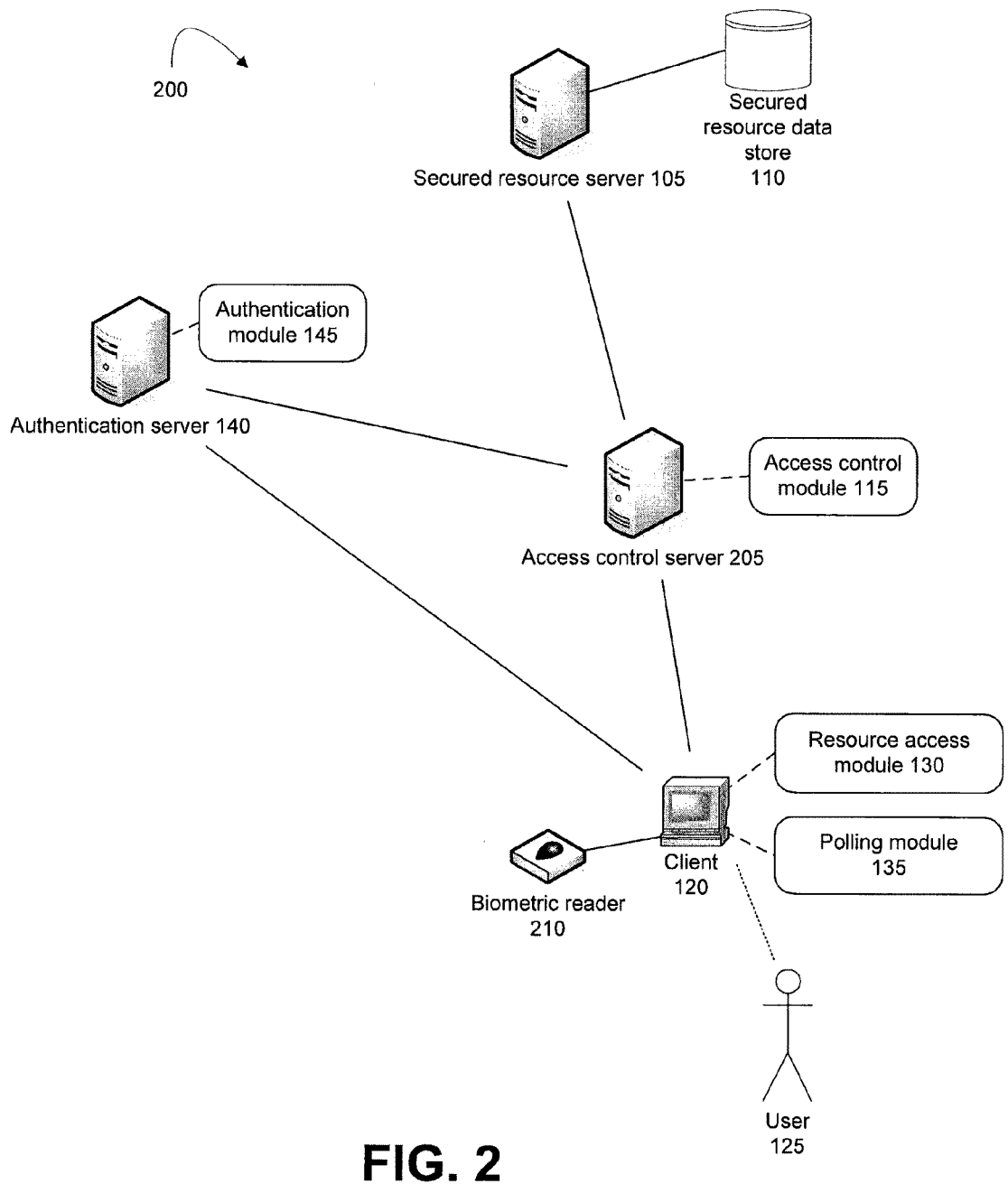
FIG. 2 is a system diagram of another exemplary distributed application environment using a polling authentication system incorporating biometrics.

The client 120 may be any general purpose computing device, such as a PC, or a specialized device. The client 120 may have software, such as an operating system with a network protocol stack, for establishing network connects to servers 105, 140, 205 (FIG. 2). The client 120 may have additional software for interacting with the secured resource server 105. For instance, the client 120 may have web browsing software to access a web based user interface provided by secured resource server 105. Similarly, the client 120 may use a web browser, or other software implementing the Hyper Text Transfer Protocol (HTTP) to communicate with authentication server 140. Software instructions for interacting with servers 105 and 140 may be provided by resource access module 130 and polling module 135.

Authentication server 140 may be a web application server that is added to the distributed application environment 100 to provide a supplemental authentication scheme to the communications between client 120 and secured resource server 105. Web application servers may allow for access to computer program logic through an HTTP interface. Accordingly, web application servers typically provide an interface of procedures or functions, layered over top of HTTP, that may be called upon by remote computing devices, e.g. client 120. Accordingly, the client 120 may execute so-called remote procedure calls on the authentication server 140. Moreover, the remote device generally initiates the procedures on the authentication server 140 due to the nature of the underlying HTTP server. The authentication server 140 may communicate with the remote device, e.g. the client 120, in response to a specific request or remote procedure call. The functions and procedures that are remotely available may be included in the authentication module 145. The authentication module may further include additional software or programming logic outside of any remote procedures that is necessary to implement the authentication scheme.

FIG. 2 illustrates another exemplary distributed application environment 200. This environment provides an access control server 205 intermediating the connection between the client 120 and the secured resource server 105 and a biometric reader 210 connected to the client 120. The illustration of these two components 205, 210 does not indicate a necessary pairing. For instance the environment 200 may be implemented without the biometric reader 210. Similarly, the biometric reader 210 could be added to the environment 100 that lacks the access control server 205.

In this exemplary distributed application environment 200, access control may be provided by an access control server 205. Access control server may be operated by a third-party such as a reseller that brokers access to the secured resource server. Access control server 205 may implement authorization levels or package access to secured resource server 105 into various products that may be purchased by, or otherwise provided to, client 120. Providing access control server 205 as an intermediary between the secured resource server 105 and the client 120 may be advantageous in situations where the entity operating access control server 205 has a more detailed understanding of the needs of client 120 with respect to secured resource server 105. In such an environment 200, access control module 115 may reside at the access control server 205. Similarly, authentication server 140 may communicate with access control server 205 to determine whether client 120 and user 125 have been adequately authenticated. Once authenticated, access control server 205 may determine the authorization level, if any, that client 120 may have with respect to use of the secured resource server 105.

A biometric reader 210 may be used by client 120 for receiving credentials from the user 125. The biometric reader may be a peripheral device attached to client 120, such as a USB peripheral. In another approach, the biometric reader 210 may be integrated in to client 120. In yet another approach, the biometric reader 210 may be included with a flash memory storage unit that is removably attached to client 120. Biometric readers 210 may be available for determining different biometric attributes including fingerprints, palm prints, retina patters, facial shapes, voice signatures, etc. The biometric reader 210 may store a previously recorded template of the particular biometric attribute, e.g., a fingerprint. This template may be compared to current biometric reading or scan. Some biometric readers 210 may convert the biometric reading into a secured passkey upon a successful match with the template. The secured passkey may then be provided to the authentication module 145 for authentication. An exemplary method of producing a passkey from a biometric reading may be found in PCT Patent Application PCT/US06/01900.

Computing devices such as secured resource server 105, client 120, authentication server 140, access control server 205, etc., may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as secured resource server 105, client 120, authentication server 140, access control server 205, etc., may each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Secured resource data store 110 may include a query processor that employs Structured Query Language (SQL) in addition to a language for creating, storing, editing, and executing stored procedures, such as the Procedural Language/Structured Query Language (PL/SQL) utilized by Oracle, as mentioned above. Secured resource data store 110 may be a type of database other than an RDBMS such as a hierarchical database, a set of files, an application database in a proprietary format, etc. Secured resource data store 110 generally includes a computing device employing a computer operating system such as one of those mentioned above, and is accessed via a network in any one or more of a variety of manners, as is well known. Exemplary systems are possible in which at least a portion of secured resource data store 110 are provided by a plurality of data storage devices.

The exemplary process steps described below may include network based communications between computing devices according to a communication protocol, e.g. HTTP. Such a communication protocol may include communications in the form of a request from one device to another. The requesting device may then receive a subsequent response to the request. An established communication protocol such as HTTP including request-response based network communications may accommodate security policies that prevent incoming communications that are not being provided in response to a request. Accordingly, communications generally include a request followed by a response.

In the following exemplary process steps, both the client 120 and the user 125 operating the client 120 may be the subject of the authentication. Accordingly, the use of the term client 120 rather than user 125 should not be seen as limiting the exemplary step to only the client 120. Similarly, exemplary steps may indicate that the user 125 may be providing user input such as credentials. However, the client 120 may be providing the input programmatically, e.g. through a data file or other information accessible to the client 120.

Figure 3:
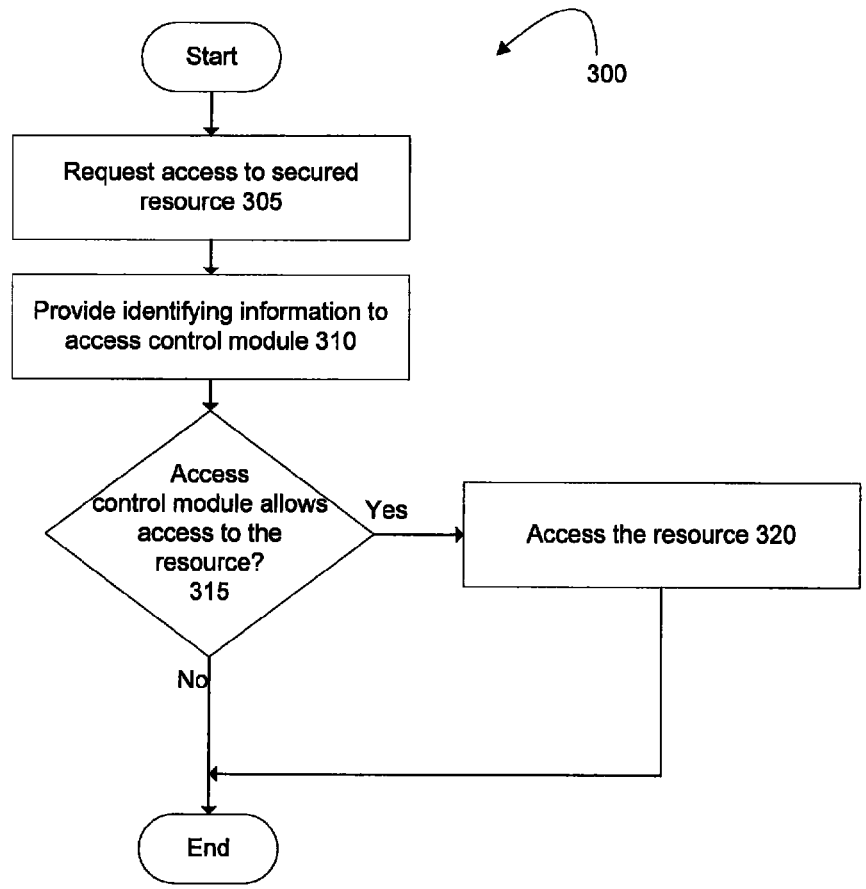
FIG. 3 is a flowchart depicting exemplary steps and decisions related to a resource access module.

FIG. 3 illustrates a flowchart of an exemplary process 300 for accessing the secured resource server 105 from the client 120. The client 120 may include a computer-readable medium having stored instructions for carrying out certain operations described herein, including some or all of the operations described with respect to process 300. For example, some or all of such instructions may be included in the resource access module 130. Process 300 is described as an interactive user process. However, it is to be understood that automated or other types of programmatic techniques may implement the following steps.

The process 300 begins in step 305 in which the client 120 request access to the facilities of the secured resource server 105. For instance, the client 120 may use a web bowers, or custom client software, to connect to the interface provided by the secure resource server 105. The secured resource server 105 may be identified by a uniform resource locator (URL) that can be entered at the client 120 to connect to the server 105. The access control module 115 may recognize the access request and require that the client 120 be authenticated prior to granting access to the requested facilities. In another exemplary approach, the client 120 may direct the access request directly to the access control module 115.

Next, in step 310, the client may provide identifying information to the access control module 115. Identifying information may be a network address such as an Internet Protocol (IP) address or hardware identifier such as a MAC address or serial number. In another exemplary approach, an arbitrary, yet unique, identification number or tag may be defined for each client 120 of the distributed application environment 100, 200. In yet another exemplary approach, the identifying information may identify the user 125 of client 125 through a user name, an account code, a system ID, or the like. The identifying information may be a first authentication method such as a user name and password pair that must be first authenticated by the access control module 115 prior to proceeding with the remainder of the process. The identifying information may be read programmatically during the communication between the client 120 and the access control module 115. In another exemplary approach, the access control module 115 may provide an interface for the user 125 to enter the identifying information, e.g. for the entry of a user name and password.

Next, in step 315, it is determined whether the access control module has allowed access to the resource. Processes 400, 500, and 600 (all discussed below) may occur in between steps 310 and 315 and may provide the determination of whether access has been allowed. If access is not allowed, the process 300 ends. However, if access is allowed, the process may proceed to step 320.

Next, in step 320, the client 120 may access the facilities of secured resource server 105. Access control module may regulate the access to server 105 by indicating a particular authorization level or the like. Accessing the facilities of secured resource server 105 may require a token or certificate indicating that the client 120 has been authenticated.

Following step 320, the process 300 ends.

Figure 4:
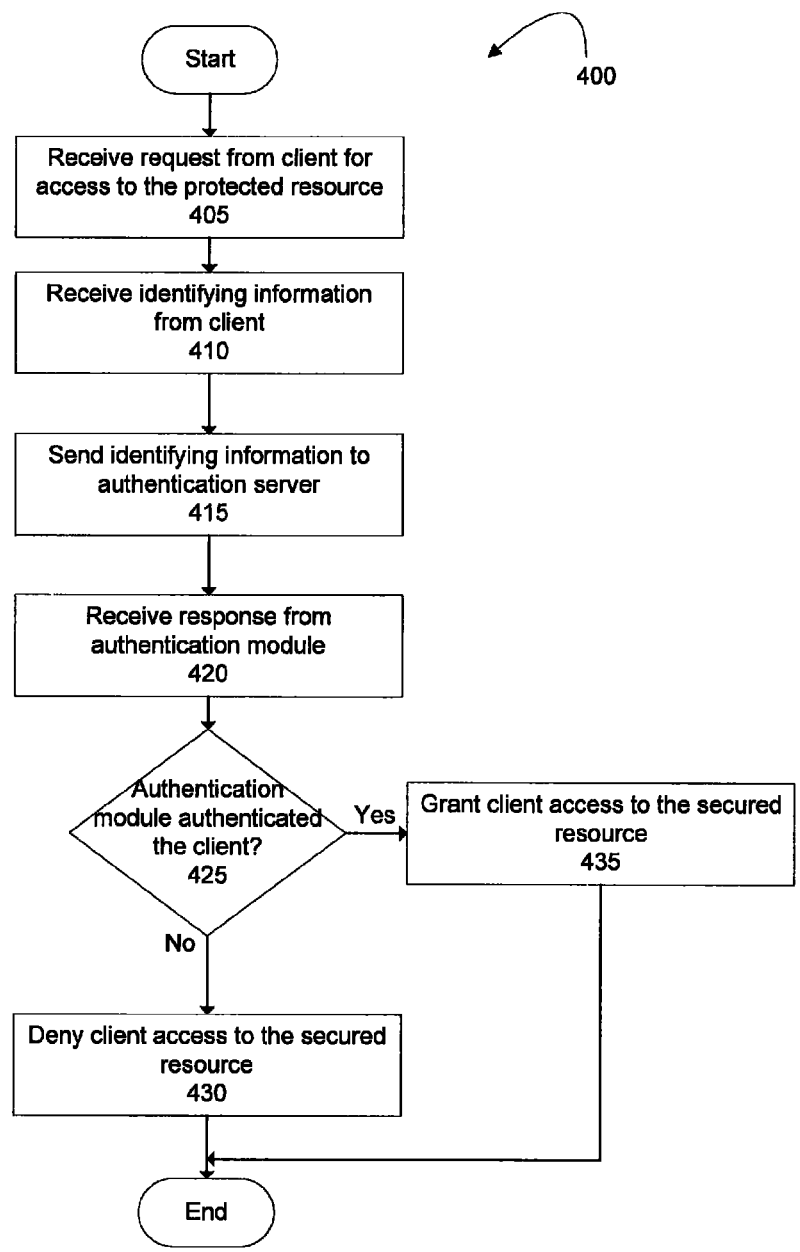
FIG. 4 is a flowchart depicting exemplary steps and decisions related to an access control module.

FIG. 4 illustrates a flowchart of an exemplary process 400 for processing a request from the client 120 for access to the secured resource server 105. The secured resource server 105 or the access control server 205 may include a computer-readable medium having stored instructions for carrying out certain operations described herein, including some or all of the operations described with respect to process 400. For example, some or all of such instructions may be included in the access control module 115.

The process 400 begins in step 405 in which the access control module receives a request from the client 120 for access to the secured resource server 105. The request may be provided through a network connection using an HTTP request. The access control module 115 may respond to the request by challenging the client 120 to provide identifying information.

Next, in step 410, identifying information may be received from the client. As discussed above, the identifying information may be read programmatically from the initial request from the client 120 or may be provided by the user 125 in a subsequent communication. The identifying information may uniquely identify the client 120 or user 125 within the environment 100, 200.

Next, in step 415, the identifying information may be provided to the authentication module 145. Providing the identifying information alerts that authentication module 145 that the client 120 wishes to be authenticated. As with other network communications, the access control module 115 may communicate with the authentication server 140 via a customized communications protocol layered over HTTP requests and responses.

Next, in step 420, a response may be received from the authentication module 145. Processes 500 and 600 (discussed below) may occur in between steps 415 and 420 and may affect the response that is received in this step 420.

Next, in step 425, it may be determined whether the authentication module 145 authenticated the client 120. An indication of whether the client 120 has been authenticated may be provided with the response received in step 420. If the client 120 has been authenticated the process may proceed to step 435.

Following a determination that the authentication module 145 did not authenticate the client 120, the client 120 may be denied access to the secured resource server 105 in step 430. A response to the client 120 request may be generated and sent to the client 120.

In step 435, the client 120 may be granted access to the facilities of the secured resource server 105 based on the decision in step 425. A response recognizing the grant of access may be generated and provided to the client 120. The response may provide an authentication certificate, or the like, that demonstrates that the client 120 has been authenticated.

Following either step 430 or 435 the process 400 ends.

Figure 5:
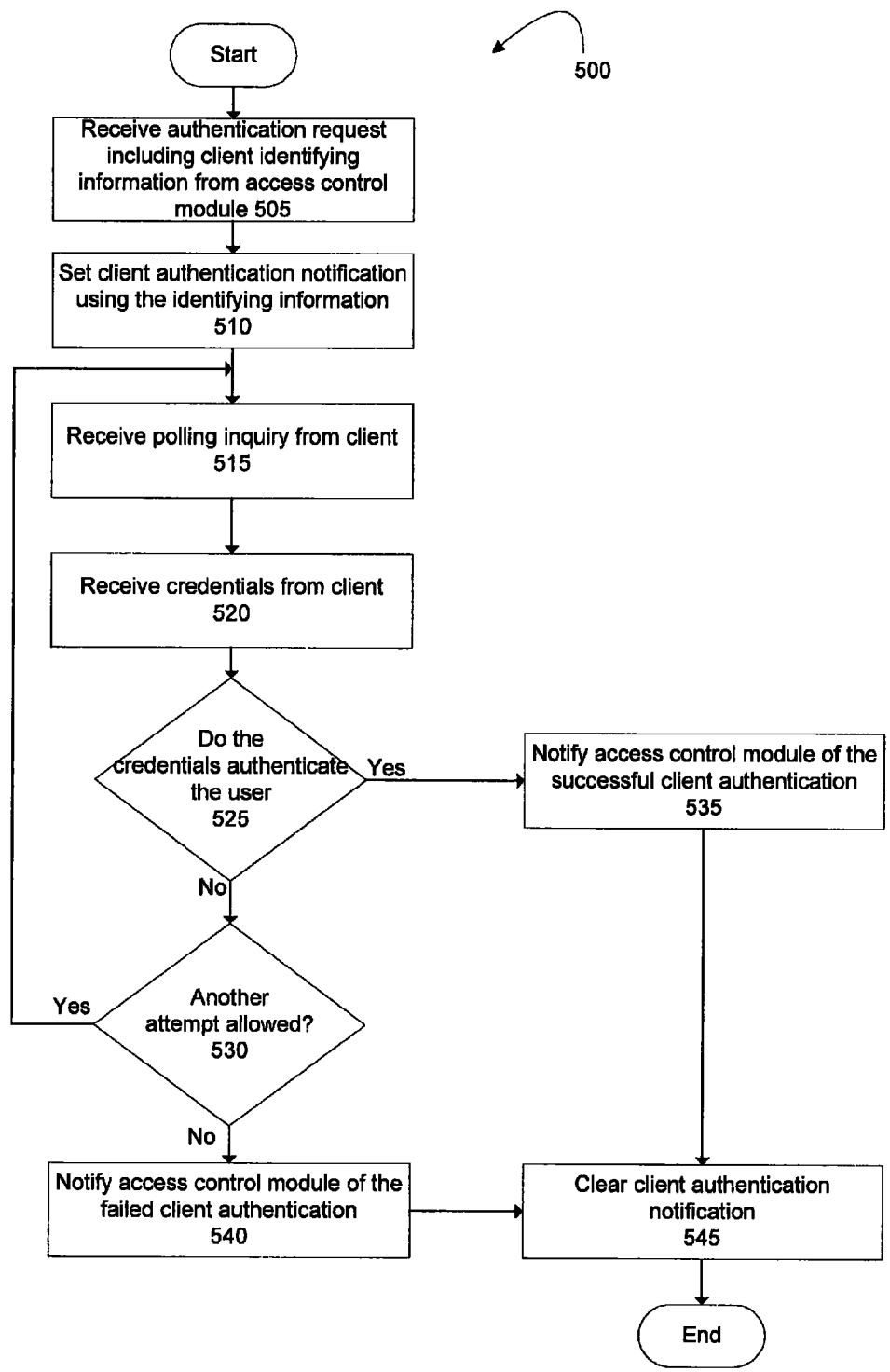
FIG. 5 is a flowchart depicting exemplary steps and decisions related to an authentication module.

FIG. 5 illustrates a flowchart of an exemplary process 500 for authenticating the client 120. The authentication server 140 may include a computer-readable medium having stored instructions for carrying out certain operations described herein, including some or all of the operations described with respect to process 500. For example, some or all of such instructions may be included in the authentication module 145.

The process 500 begins in step 505, in which the authentication module 145 receives an authentication request from the access control module 115.

Next, in step 510, the authentication module 145 sets a client authentication notification. The client authentication notification may be any type of flag, signal, etc. that is readable, or otherwise detectable, by the polling module 135. For instance, authentication server 140 may include records of all clients needing to be challenged that are indexed by the client identifying information. Accordingly, the notification is a passive notification such that the client 120 must seek out the notification. Passive notification may facilitate the use of the authentication system in an environment 100, 200 that implements a security policy preventing incoming communications to the client 120.

Next, in step 515, the authentication module 145 receives a polling inquiry from the polling module 135. While depicted as a sequential step, the polling inquiry of this step 515 may be received on a regular basis regardless of whether steps 505 and 510 occur.

Next, in step 520, credentials may be received from the client 120. As will be discussed in more detail below, the credentials may not be the same credentials provided by user 125 to client 120. The credentials received in this step 520 may transformed, such as through a hash or other types of algorithms, in order to provide a value that cannot be used to determine the credentials provided by the user 125. In one exemplary approach, the credentials are a passkey generated by the client 120 using the credentials provided by the user 125.

Next, in step 525, it is determined whether the credentials authenticate the user 125. The authentication module 145 may include credentials provided by the user 125 at an earlier time. The previously recorded credentials may be compared with the credentials that were received in step 520. If the credentials correspond to the previously recorded credentials the user 125 may be authenticated. Upon a successful authentication, the access control module 115 may be notified that the client 120 has been authenticated in step 535.

If the authentication is unsuccessful, another attempt may be allowed in step 530. If another attempt is allowed, the process may return to step 515 in order to receive another polling inquiry from the client 120.

Following a determination that additional attempts are not allowed, the process may proceed to step 540. The access control module 115 may be notified that the authentication failed and that the client 120 should not be permitted to access the facilities of the secured resource server 105.

Following both steps 535 and 540, the client 120 authentication notification may be cleared in step 545. Clearing the notification may cause the client 120 to stop challenging the user 125 to provide authenticating credentials. However, as discussed above, the polling module 135 will continue to query the authentication module 145.

Figure 6:
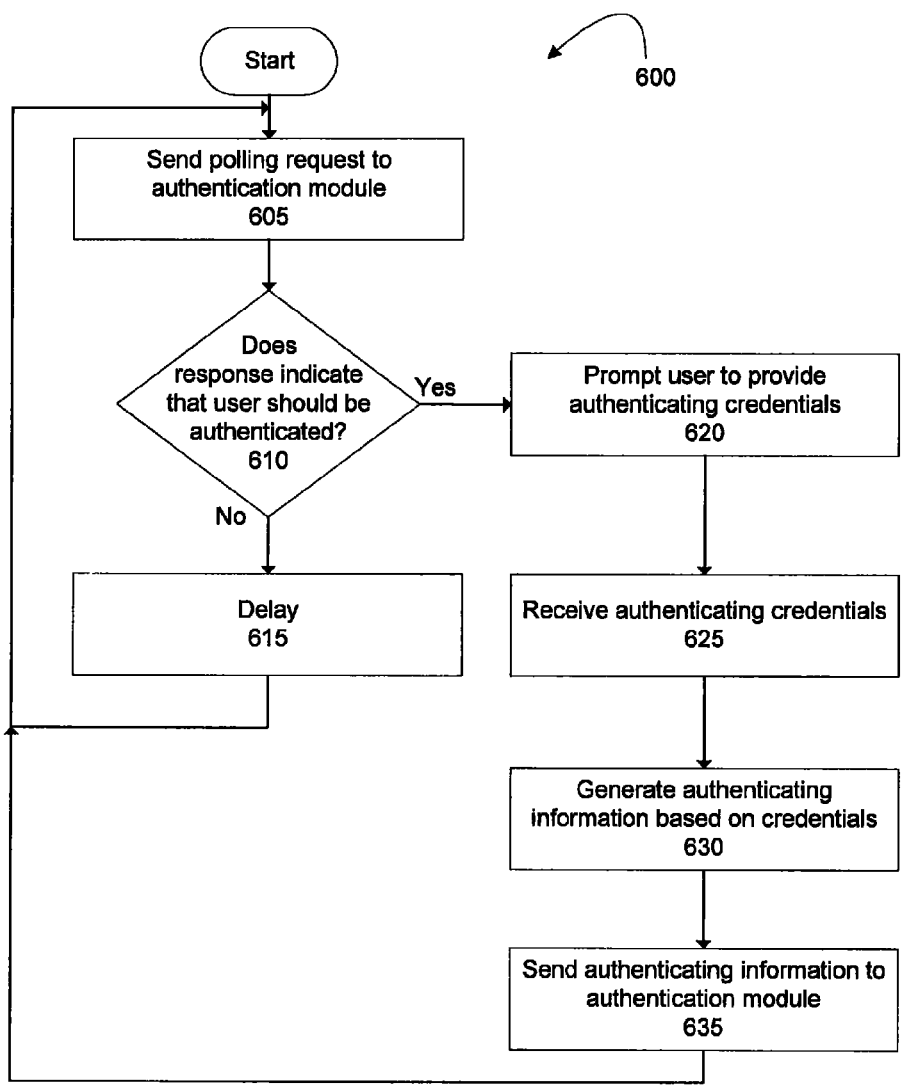
FIG. 6 is a flowchart depicting exemplary steps and decisions related to a polling module.

FIG. 6 illustrates a flowchart of an exemplary process 600 for polling the authentication module 145 to determine if the client 120 should challenge the user 125. The client 120 may include a computer-readable medium having stored instructions for carrying out certain operations described herein, including some or all of the operations described with respect to process 600. For example, some or all of such instructions may be included in the polling module 135.

Providing a supplemental authentication between the client 120 and the authentication server 140 may reduce the fraudulent access to the secured resource server 105. For instance, an unauthorized user may be able to gain access to the client 120 in order to communicate with the secured resource server 105. However, the polling module 135 and authentication module 145 may require the user to be authenticated. Accordingly, authentication module 145 and polling module 135 may supplement a weak or non-existent authentication scheme between the client 120 and the secured resource server 105.

The process 600 begins in step 605, in which the polling module 135 sends a polling request to the authentication module 145. Polling module 135 may be configured to send polling request on a regular or periodic basis, e.g. every minute. Accordingly, step 605 may occur regardless of whether any of the steps of processes 300-500 have occurred. Initiating the polling request at the polling module 135 may allow for communications between the client 120 and the authentication server 140 even if either device is protected by a firewall. For instance, many firewalls are configured to allow HTTP traffic, generally transmitted through port 80. Accordingly, the polling request of this step 605 may be provided in the form of an HTTP request to an HTTP server, i.e. a web server, operating on the authentication server 140. Any response to the HTTP request should similarly be allowed by a firewall protecting client 120.

In addition to firewall compliance, initiating the polling request at the client 120 may simplify the integration of a new authentication scheme on the client 120. There may be a large number of clients 120 that connect to secured resource server 105. Each client may have an independently created resource access module 130. Accordingly, if secured resource server 105 implemented a new authentication scheme, each resource access module 130 may need to be reprogrammed. However, a different approach from reprogramming provides the polling module 135 as an add-on component. Because the add-on component operates outside of the existing protocol between resource access module 130 and access control module 115, the integration issues may be simplified.

Next, in step 610, a response to the polling request may be provided to the polling module 135. The polling request may include information that identifies the client 120. Further the request may be in the form of a query that uses the identifying information to determine whether the client 120 should be challenged. As discussed above with respect to step 510 of process 500, the authentication module 145 may keep a record of whether client 120 should challenge the user 125 to provide authentication credentials. The identifying information included with the polling request may be used to query these records in order to determine whether the client 120 should challenge the user. If the response to the request indicates that the user 125 should be challenged, then the process may proceed to step 620. However, if the user 125 does not need to be challenged, the process may proceed to step 615.

In step 615, a delay may be imposed before another polling request is sent to the authentication module 145. As discussed above, polling module 135 continuously polls the authentication module 145 to determine whether the user 125 should be challenged to provide credentials. This polling may occur regardless of whether there has been any communication between the client 120 and the secured resource server 105.

In step 620, the user 125 may be challenged to provide authenticating credentials. For instance, polling module 135 may provide a user interface for the client to enter a username and password. In another exemplary approach, the client 120 may be subject to authentication and may be programmatically challenged to provide credentials such as information or data files accessible to the client, e.g. a digital certificate.

Next, in step 625, the authenticating credential may be received. For instance, the user 125 may have entered a user name and password. Polling module 135 may validate the user name and password locally or may rely on the authentication module 145 to provide the validation. The username and password may be converted to an irreversible representation using a hashing algorithm, or the like. Such a conversion may prevent the discovery of the username and password if the transmission between the client 120 and authentication server 140 were ever intercepted.

In another exemplary approach using a biometric reader 210, the user 125 may have submitted to a biometric scan, e.g. a fingerprint scan. The biometric reader may convert the scan into a representation suitable for comparison to a previously stored scan. The degree of correspondence between the previously stored scan and the instant scan may be determined. If the degree of correspondence exceeds a threshold, it may be determined that the scans match. If the scans are determined to match, the scan may be converted to an irreversible representation for transmission to the authentication module 145. For instance, the scan may be converted into a secure passkey and used to generate the authentication information in step 630.

Next, in step 635, the authenticating credentials, in their original or derivative form, may be provided to the authentication module 145 for authentication. Following step 635, the process may return to step 605 in order to continue sending regularly schedule polling requests.

Accordingly, exemplary systems and methods of authentication have been described. The exemplary systems and methods may supplement distributed application environments 100, 200 by providing an authentication module 145 that receives regular polling requests from a polling module 135. Layering a supplemental authentication system over existing application environments 100 may simplify integration and may cooperate with existing security policies.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A method comprising:
   sending, from a client device, a polling inquiry to an authentication module, wherein the polling inquiry queries the authentication module for records indicating that a user of the client device must be authenticated before the client device can access a protected resource;
   identifying a passive notification sent from the authentication module in response to the inquiry, wherein the passive notification indicates that the user of the client device must be authenticated to access the protected resource;
   accepting authentication credentials in response to the passive notification; and
   transmitting authentication information based on the authentication credentials to the authentication module.

2. A method as set forth in claim 1, further comprising prompting the user to provide authentication credentials if the passive notification is set.

3. A method as set forth in claim 2, further comprising generating authentication information based on the authentication credentials provided by the user.

4. A method as set forth in claim 1, further comprising:
   transmitting a request to access the protected resource to an access control module;
   intercepting the request to access the protected resource at the authentication module; and
   setting the passive notification in response to the authentication module receiving the request to access the protected resource.

5. A method as set forth in claim 4, further comprising transmitting identifying information to the authentication module with the polling inquiry.

6. A method as set forth in claim 4, further comprising transmitting the identifying information from the access control module to the authentication module.

7. A method as set forth in claim 1, further comprising receiving the passive notification from the authentication module in response to transmitting identifying information with the polling inquiry to the authentication module.

8. A method as set forth in claim 1, further comprising granting access to the protected resource based on the authentication information.

9. A method as set forth in claim 1, further comprising denying access to the protected resource based on the authentication information.

10. A system comprising:
    a remote server in communication with a client device and hosting an access control module;
    an authentication server in communication with said remote server and hosting an authentication module and configured to generate a passive notification indicating that a user of a client device must be authenticated; and
    a polling module in communication with said authentication module and said access control module and configured to send a polling inquiry to said authentication module, wherein the polling inquiry queries the authentication module for records that indicate that the user of the client device must be authenticated before the client device can access a protected resource, wherein the polling module is further configured to identify the passive notification sent from said authentication module to the polling module in response to the inquiry, accept authentication credentials in response to presenting the passive notification to the user via the client device, and transmit authentication information based on the authentication credentials to said authentication module.

11. A system as set forth in claim 10, wherein said polling module is further configured to prompt the user to provide the authentication credentials if the passive notification is set.

12. A system as set forth in claim 11, wherein said polling module is further configured to generate authentication information based on the authentication credentials provided by the user.

13. A system as set forth in claim 10, wherein said polling module is further configured to transmit a request to access the protected resource to said access control module and wherein said authentication module is configured to intercept the request and set the passive notification in response to receiving the request.

14. A system as set forth in claim 13, wherein said polling module is further configured to transmit identifying information to said authentication module with the polling inquiry.

15. A system as set forth in claim 13, wherein said access control module is configured to transmit the identifying information to said authentication module.

16. A system as set forth in claim 10, wherein said authentication module is configured to grant or deny access to the protected resource based on the authentication information.

17. A system as set forth in claim 10, wherein said authentication module is configured to set the passive notification in response to receiving a request to access said remote server.

18. A system as set forth in claim 17, wherein said authentication module is configured to respond to the polling inquiry with the passive notification indicating whether authentication is required.

19. A system as set forth in claim 17, wherein said authentication module is configured to receive an authentication request that includes identifying information from said access control module.

20. A system as set forth in claim 10, wherein said remote server is a secured resource server hosting a secured resource data store.

21. A system as set forth in claim 10, wherein said remote server is an access control server in communication with a secured resource server hosting a secured resource data store.

* * * * *